United States Patent Office 3,518,319
Patented June 30, 1970

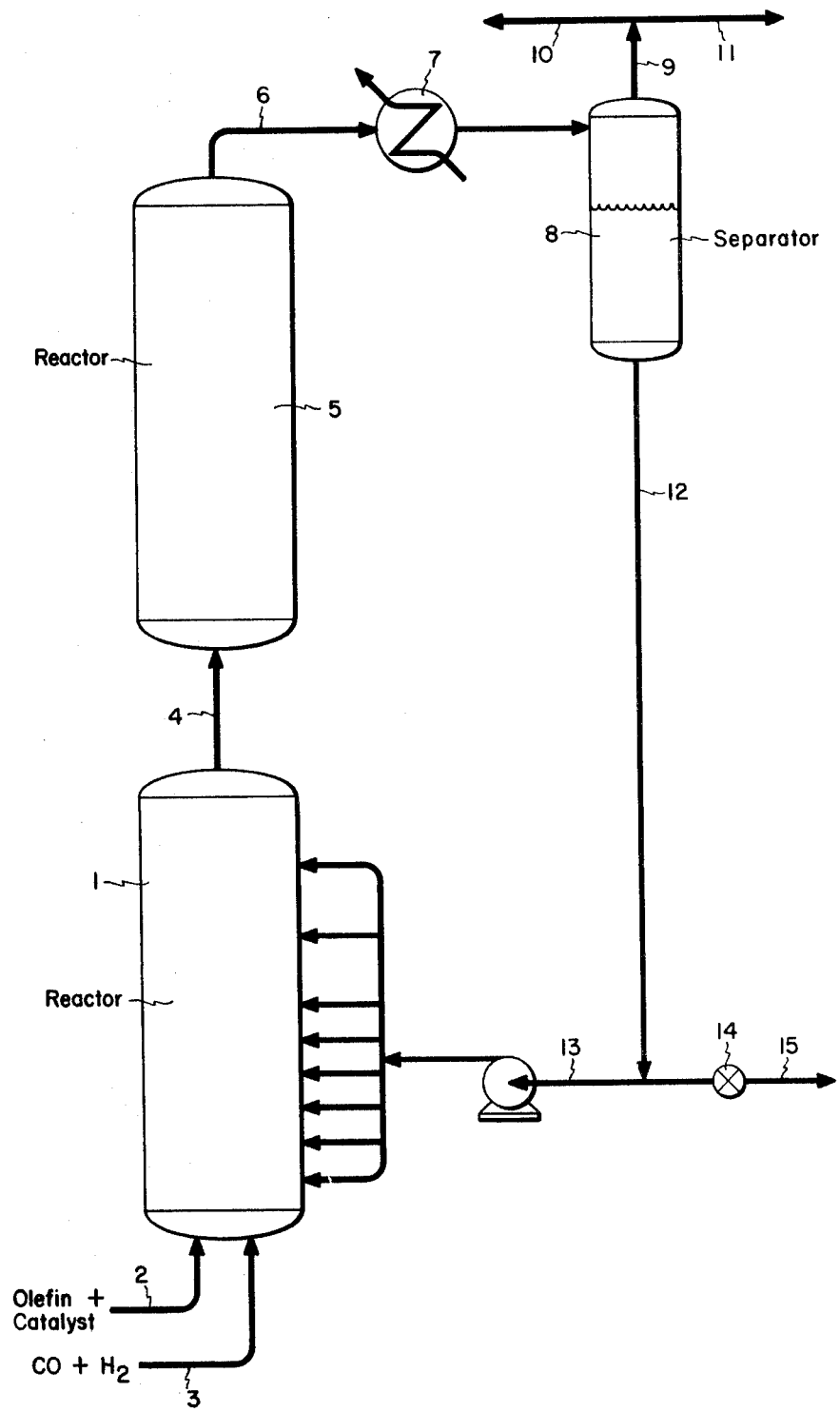

3,518,319
PROCESS FOR IMPROVING OXO SELECTIVITY
TO UNBRANCHED ALCOHOLS
Henry George Ellert, James William Robinson, and John
Dana Koontz, Baton Rouge, La., assignors to Esso
Research and Engineering Company, a corporation of
Delaware
Filed Mar. 30, 1965, Ser. No. 443,889
Int. Cl. C07c 45/08
U.S. Cl. 260—638    9 Claims

ABSTRACT OF THE DISCLOSURE

In the oxonation of unbranched olefins, improved selectivities to unbranched aldehydes and/or alcohols are obtained by employing a two-stage or two-vessel reactor whereby the unbranched olefinic compounds, $H_2$, CO and a carbonylation catalyst are reacted in the first carbonylation zone at a temperature of from 150° to 250° F. and at a pressure ranging from 1500 to 4500 p.s.i.g. The liquid product from the first zone is then passed into the second carbonylation zone wherein the temperature is maintained at about 275° to 400° F. and at a pressure of from 1500 to 4500 p.s.i.g. A portion of the final aldehyde product withdrawn from the second carbonylation zone is recycled to the first carbonylation zone and the remainder may be hydrogenated to a primary, unbranched alcohol product.

---

The present invention relates to the preparation of oxygenated organic compounds by the reaction of olefins with hydrogen and carbon monoxide in the presence of a carbonylation catalyst. More specifically, the present invention relates to a novel process for improving the selectivity to unbranched aldehydes and/or alcohols in the the oxonation of unbranched olefins by employing a two stage or two vessel reactor.

It is well known in the art that oxygenated organic compounds may be synthesized from organic compounds containing olefinic linkages by a reaction with carbon monoxide and hydrogen in the presence of catalyst containing metals of the iron group in a two-step process in which predominantly aldehydes and a minor proportion of alcohols are formed in a first step in the presence of a carbonylation catalyst comprising metals of the iron group and particularly cobalt and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second step hydrogenation catalyst may comprise any known reduction catalyst such as metallic supported or unsupported nickel, copper chromite, sufactive catalysts such as oxides and sulfides of tungsten, nickel and molybdenum and the like. Accordingly, the instant invention is concerned with both a process comprising but one step for the preparation of predominantly aldehyde product as well as the two-step process referred to.

The two-step carbonylation-hydrogenation or oxo reaction by which name this process is generally known, provides a particularly attractive method of preparing primary alcohols to supply the large market for plasticizers, detergents, solvents and the like. Amenable to the reaction to a greater or less degree are long and short chained olefinic compounds, not only hydrocarbons, but most other organic compounds having a carbon-to-carbon olefinic linkage such as unsaturated alcohols, acids, esters and the like. Straight and branch chained olefins, such as propylene, butene, pentene, hexene, heptene, styrene, olefin polymers such as a di- and tri-isobutylene, hexene and heptene dimers, polypropylenes, olefin fractions from the hydrocarbon synthesis process, thermal or catalytic cracking operations and other sources of hydrocarbon fractions containing such olefins may be used as starting materials depending on the nature of the final product desired. The synthesis gas mixture fed to the first step may be any desired ratio of $H_2$ to CO, preferably within the limits of 0.5 to 5 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p.s.i.g. and the ratio of synthesis gas to olefin may vary widely; in general about 2500 to 25,000 cubic feet of $H_2+CO$ per barrel of olefin feed are employed.

The catalyst for the first step of the process is preferably employed in the form of an oil-soluble compound of the catalytically active carbonylation metal. Thus there have been employed the salts of the metals such as cobalt and high molecular weight fatty acids such as stearic, oleic, naphthenic, linoleic and the like. Water soluble catalysts, such as cobalt acetate, chloride, and the like, have also been successfully employed. Catalyst concentrations may vary from about 0.05 to 5.0% by weight of the catalyst calt calculated as cobalt based on the olefinic feed. The first step or carbonylation reaction is generally carried out at temperatures in the range of from about 200° or 250° to 400° F. depending upon the nature of the olefin and other reaction conditions. In general, the lower olefins will react at lower temperatures and react to a greater extent than the high molecular weight olefins. The carbonylation reaction is an exothermic one, with a heat release of the same high order of magnitude as in the hydrogen synthesis process, about 35 to 50 kcal./gram-mol olefinic double bond reacted and, therefore, careful temperature control is required in the reaction zone to prevent decomposition of cobalt carbonyl to metallic cobalt and also to prevent formation of secondary reaction products and undesired reactions, such as hydrogenation of the olefin, formation of hydrocarbon synthesis product and the like.

Versatile as this alcohol synthesis or oxo reaction is in the production of alcohols from olefins, the process, in the past, has not proved itself advantageous for the preparation of unbranched alcohols. Thus, under conventional oxonation conditions, straight chained alpha-olefins are converted to approximately equal amounts of the corresponding unbranched and methyl branched alcohols. Selectivity to the preferred, unbranched isomer, therefore, has been wanting, consequently, deterring from a commercially feasible operation.

In addition, cooling for the first or carbonylation step has heretofore been accomplished by the injection of cooled recycled synthesis gas into the first step reactor. This method of cooling is unsatisfactory inasmuch as excessively large amounts of cooling gas are required, e.g., on the order of about 25,000–100,000 cubic feet per barrel of olefin introduced into said reactor due to the relativity low temperature level of the carbonylation reaction and the restricted temperature gradient within the reactor, i.e. usually less than about 100° F. This cooling gas must also be scrubbed first with suitable liquid to remove cobalt carbonyl so as to prevent line plugging and, thus, high gas rates would also involve large quantities of scrubbing liquid which must subsequently be run through a catalyst removal zone.

It is, therefore, an object of the present invention to produce unbranched aldehydes and/or alcohols from unbranched olefins and, concomitantly, provide an effective method of cooling the carbonylation reaction.

It is a further object of the present invention to provide a novel process for producing substantial yields and high selectivities of unbranched aldehydes and/or alcohols from unbranched olefinic materials.

Other and further purposes and objects of the present invention will become apparent hereinafter.

Broadly, the above objects are accomplished by a process for initially converting an unbranched olefinic compound having $n$ carbon atoms in the molecule into unbranched aldehyde having $n+1$ carbon atoms, $n$ being an integer in the range of from 3 to about 30, which comprises passing said olefinic compound, $H_2$, CO, and a carbonylation catalyst into a first carbonylation zone at an olefin flow rate of 0.05 to 1.5 v./v./hr., maintaining carbonylation temperatures of from 150° to 250° F. and pressures of from 1500 to 4500 p.s.i.g. in said zone, withdrawing aldehyde product from said first carbonylation zone and, in order to prepare an alcohol-comprising product, passing said aldehyde product into a second carbonylation zone at a flow rate of from 0.05 to 1.5 v./v./hr., maintaining carbonylation temperatures in said second carbonylation zone of from about 275° to 400° F. and pressures of from about 1500 to 4500 p.s.i.g. in said zone, withdrawing a final aldehyde product from said second carbonylation zone, recycling a portion of said final aldehyde product from said second carbonylation zone to said first carbonylation zone at a flow rate of 0.5 to 3.0 w./w. fresh olefin feed and hydrogenating a portion of said final aldehyde product and recovering a primary unbranched alcohol having $n+1$ carbon atoms. Accordingly, the process of this invention permits low temperature operation of the first carbonylation zone without preforming of the catalyst utilized. Such low temperature operation is attributable to the active catalyst contained in said recycle stream which is thus advantageously used in the low temperature zone which is maintained at a temperature not high enough to form active catalyst. In addition, effective cooling of the first carbonylation zone is accomplished, thus adding to the commercial feasibility of the process. In addition, further advantages accrue inasmuch as selectivity to the preferred, unbranched isomer is greatly enhanced by the technique which comprises the present invention.

The present invention will be best understood from the more detailed description hereinafter, wherein reference will be made to the accompanying drawing which is a schematic illustration of a system suitable for carrying out a preferred embodiment of the invention for the preparation of alcohols.

Referring now to the drawing, an olefinic hydrocarbon is fed through line 2 to the bottom of a primary reactor 1. The latter comprises a reaction vessel preferably divided into discrete zones separated by trays and free space. The reactor is preferably packed with inert solid materials, such as Raschig rings, porcelain chips, ceramic material, pumice, and the like, to facilitate gas-liquid contact. Also passed into reactor 1 is the carbonylation catalyst, e.g. cobalt catalyst, utilized. In a preferred modification, a cobalt catalyst is employed dissolved in the olefin feed and is admitted through line 2. It is to be understood that other forms of cobalt such as an aqueous solution of a cobalt salt, i.e., cobalt acetate, or a slurry of oil-insoluble cobalt solids, such as cobalt oxide, metal carbonate and the like, may be employed. Cobalt is generally added preferably to the extent of 0.1 wt. percent to 0.5 wt. percent or 0.01 to 0.06 mol/liter calculated as metal and olefin feed.

Simultaneously, a gas mixture containing $H_2$ and CO in approximate ratio of 0.5 to 2 volumes of $H_2$ per mol CO is supplied through line 3 and flows concurrently with the olefinic and aldehyde product upwardly through reactor 1. The latter is operated at pressures of about 1500–4500 p.s.i.g., preferably 2500–3500 p.s.i.g. and temperatures of 150°–250° F., preferably 175°–225° F. Liquid aldehyde product comprising the substantially carbonylated reaction product is withdrawn from the upper portion of reactor 1 through line 4. The product which is at a temperature of about 200 to 250° F., is then passed usually without cooling, to the bottom of secondary reactor 5. Secondary reactor 5, similar to reactor 1, comprises a reaction vessel preferably divided into discrete zones separated by trays and free space and preferably packed with inert solids to facilitate gas-liquid contact. In reactor 5, the cobalt catalyst, initially in the "soap" form, is converted to the cobalt carbonyl form. Reactor 5 is operated at pressures of about 1500–4500 p.s.i.g., preferably 2500–3500 p.s.ig., and temperatures of 275°–400° F., preferably 325°–360° F.

Liquid final aldehyde product containing high concentration of cobalt carbonyl is withdrawn from the upper portion of reactor 5 through line 6. The product which is at a temperature of about 350° to 400° F., is then passed to cooler 7 where the temperature is lowered to about 120° to 170° F., and then passed to high pressure gas-liquid separator 8. Herein separation of unreacted and undissolved gases from liquid product occurs. The unreacted gases may be withdrawn through line 9 and, after scrubbing, may be recycled to the system via line 10, or in part purged via line 11. Liquid aldehyde product is withdrawn from high pressure separator 8 through line 12. A portion of the stream is preferably passed via line 13 to primary aldehyde synthesis reactor 1 to supply both cooling and a portion of the catalyst requirements of that vessel, generally at a rate of 0.5 to 3.0 w./w. of fresh feed, the amount of product recycle being a function of the amount of cooling required in the reactor. The recycled liquid is preferably added along the length of reactor 1.

Liquid aldehyde product not recycled to reactor 1 is passed through pressure release valve 14 and line 15. This material, containing dissolved cobalt carbonyl, is sent to a catalyst decomposition or decobalting zone where, in the presence of heat and steam, water, or dilute organic acid, the metal contaminant may be removed from the aldehyde product. The metal compounds may be decomposed by indirect heating; steam, etc., or may be made insoluble in the organic mixture by treatment with a low molecular weight organic acid such as acetic, oxalic, etc. Various demetalizing techniques are known and, in this invention, any one may be employed.

The aldehyde product, substantially completely free of any organic compounds, is then hydrogenated under conventional conditions to alcohol and the alcohol product fractionated to produce substantially unbranched $n+1$ alcohols, as described.

The process of the present invention may be further illustrated by the following specific examples.

EXAMPLE I

In accordance with the process of the present invention, a stream of butene-1 is introduced into a primary reactor at a flow rate of about 0.6 v./v./hr. wherein said feedstock is oxonated at a temperature of 175° F. and a pressure of 3000 p.s.i.g. of a 1.2:1 ratio of $H_2$:CO gas pressure. The catalyst consists of 0.2 wt. percent of cobalt based on the feedstock, said cobalt being introduced as cobalt oleate. The substantially completely carbonylated liquid product is removed from the primary reactor and introduced into the bottom of a secondary reactor at a flow rate of about 0.6 v./v./hr. In said secondary reactor the aldehyde liquid product is further oxonated at a temperature of about 350° F. and at a pressure of 3000 p.s.i.g. The final carbonylated product is removed from the top of the secondary reactor and, after cooling and separation of unreacted gases, etc., a portion of said final product is recycled at a flow rate of 0.2–0.6 v./v./hr. from the secondary reactor to a number of points in the primary reactor. The final aldehyde product is then freed of cobalt carbonyl by heating to 350° F. under 500 to 1000 p.s.i.g. hydrogen pressure. Hydrogenation of the product is accomplished by treating the decobalted product with 12 vol. percent of reduced nickel catalyst at 3000 p.s.i.g. of Co-free hydrogen pressure for about 6 hours at 350° F. The product is distilled at atmospheric pressure on a 1 in.-30-plate Oldershaw column at 5/1 reflux ratio. The final alcohol product contains about 79 mol percent of the desired unbranched product.

EXAMPLE II

In order to compare an oxonation reaction of the prior art with the process of the present invention, butene-1 identical to that employed in Example I is introduced into a packed reactor at a flow rate of about 0.3 v./v./hr. wherein said feedstock is oxonated at a temperature of 350° F. and a pressure of 3000 p.s.i.g. of a 1.2:1 ratio of $H_2:CO$ gas pressure. The catalyst consists of 0.2 wt. percent of cobalt based on the feedstock, said cobalt being introduced as cobalt oleate. Final aldehyde product is then freed of cobalt carbonyl by heating to 350° F. under 500 to 1000 p.s.i.g. hydrogen pressure. Hydrogenation of the product is accomplished by treating the decobalted product with 12 vol. percent of reduced nickel catalyst at 3000 p.s.i.g. of CO-free hydrogen pressure for about 6 hours at 350° F. The product is distilled at atmospheric pressure on a 1-inch 30-plate Oldershaw column at 5/1 reflux ratio. The final alcohol product contains only about 48 mol percent of the desired unbranched product, and contains about 52 mol percent of the undesired methyl branched isomer.

EXAMPLE III

In accordance with an embodiment of the process of the present invention, butene-1 identical to that employed in Examples I and II is introduced into the bottom of a two stage or zone reactor at a flow rate of about 0.3 v./v./hr. wherein said feedstock is essentially completely oxonated in the first zone of said reactor at a temperature of 210° F. and a pressure of 2800 p.s.i.g. of a 1.2:1 ratio of $H_2:CO$ gas pressure. The catalyst consists of 0.25 wt. percent of cobalt based on the feedstock, said cobalt being introduced as cobalt oleate. The stream of the substantially completely oxonated liquid product is continued inside said reactor wherein said liquid product is further oxonated in the upper zone or stage of said reactor at a temperature of about 340° F. and at a pressure of 2800 p.s.i.g. The final carbonylated product is removed from the top of the reactor and a portion of said final product is recycled at a flow rate of 0.4 v./v./hr. to a number of points along the first zone, i.e., the bottom portion of said reactor.

The final aldehyde product is then freed of cobalt carbonyl in accordance with the technique employed in Examples I and II, i.e., by heating to 350° F. under 500 to 1000 p.s.i.g hydrogen pressure. Hydrogenation of the product is accomplished by treating the decobalted product with 12 vol. percent of reduced nickel catalyst at 3000 p.s.i.g. of CO-free hydrogen pressure for about 6 hours at 350° F. The product is distilled at atmospheric pressure on a 1-inch 30-plate Oldershaw column at 5/1 reflux ratio. The final alcohol product contains about 70 mol percent of the desired unbranched product.

The process of this invention as exemplified above is equally applicable to a broad scope of starting materials. It is manifest, therefore, that while various embodiments have been described, it should be understood that the invention is not restricted thereto and is intended to cover all modifications of the invention which would be apparent to one skilled in the art and that would come within the scope of the intended claims.

What is claimed is:

1. The process for converting an unbranched olefinic compound having $n$ carbon atoms in the molecule into unbranched primary alcohol having $n+1$ carbon atoms, which comprises passing said olefinic compounds, $H_2$, CO and a carbonylation catalyst into a first carbonylation zone at a flow rate of 0.05 to 1.5 v./v./hr., maintaining carbonylation temperatures of from 150° to 250° F. and pressures of from 1500 to 4500 p.s.i.g. in said first zone. withdrawing aldehyde product from said first zone and passing said aldehyde product into a second carbonylation zone at a flow rate of from 0.05 to 1.5 v./v./hr., maintaining carbonylation temperatures in said second carbonylation zone of from about 275° to 400° F. and pressures of from 1500 to 4500 p.s.i.g. in said second zone, withdrawing a final aldehyde product from said second carbonylation zone, recycling a portion of said final aldehyde product from said second carbonylation zone to said first said carbonylation zone at a flow rate of from 0.5 to 3.0 w./w./fresh feed and hydrogenating a portion of said final aldehyde product and recovering a primary alcohol having $n+1$ carbon atom.

2. Process of claim 1 wherein said olefinic compound is a $C_3$ to about $C_{30}$ unbranched olefinic compound.

3. The process of claim 2 wherein said olefinic compound is an olefinic hydrocarbon compound.

4. The process of claim 1 wherein said first carbonylation zone is maintained at temperatures of from 175° to 225° F. and pressures of from 1500 to 3000 p.s.i.g.

5. The process of claim 1 wherein said second carbonylation zone is maintained at temperatures of from 325° to 375° F. and pressures of from 2500 to 3500 p.s.i.g. in said zone.

6. The process for converting an unbranched alpha-olefin compound having $n$ carbon atoms in the molecule into an unbranched primary alchol having $n+1$ carbon atoms, $n$ being an integer in the range of from 3 to about 30, which comprises passing said alpha-olefin, $H_2$, CO and a cobalt carbonylation catalyst into a first reactor at a flow rate of 0.05 to 1.5 v./v./hr., maintaining carbonylation temperatures of from 150° to 250° F. and pressures of from 1500 to 4500 p.s.i.g. in said zone, withdrawing aldehyde product from the top of said first reactor and passing said aldehyde product into the bottom of the second reactor at a flow rate of from 0.05 to 1.5 v./v./hr., maintaining carbonylation temperatures in said second reactor of from about 275° to about 400° F. and pressure of from about 1500 to 4500 p.s.i.g. in said second reactor, withdrawing a final aldehyde product from said second reactor, recycling a portion of said final aldehyde product from said second reactor to a plurality of points along said first reactor at a flow rate of from 0.5 to 3.0 w./w./fresh feed and hydrogenating a portion said final aldehyde product and recovering a substantially unbranched alcohol having $n+1$ carbon atoms.

7. The process of claim 6 in which said first carbonylation zone is maintained at temperatures of from 175° to 225° F. and pressures of from 1500 to 3000 p.s.i.g.

8. The process of claim 6 wherein said second carbonylation zone is maintained at temperatures of from 325° to 360° F. and pressures of from 2500 to 3500 p.s.i.g. in said zone.

9. The process of claim 6 wherein said unbranched alpha-olefin compound is an unbranched alpha-olefinic hydrocarbon compound.

References Cited

UNITED STATES PATENTS

| | | | |
|---|---|---|---|
| 2,779,802 | 1/1957 | Harlan | 260—604 |
| 2,827,491 | 3/1958 | Mertzweiller | 260—604 |
| 2,638,487 | 5/1953 | Russum et al. | 260—604 X |

OTHER REFERENCES

Hughes et al.: Industrial and Engineering Chem., vol. 49, 1957.

BERNARD HELFIN, Primary Examiner

R. H. LILES, Assistant Examiner

U.S. Cl. X.R.

260—638, 602, 635, 604